United States Patent Office 3,224,912
Patented Dec. 21, 1965

3,224,912
USE OF HYDROGEN HALIDE AND HYDROGEN IN SEPARATE STREAMS AS CARRIER GASES IN VAPOR DEPOSITION OF II-VI COMPOUNDS
Robert A. Ruehrwein, Clayton, Mo., assignor to Monsanto Company, a corporation of Delaware
No Drawing. Filed July 13, 1962, Ser. No. 209,777
11 Claims. (Cl. 148—175)

The present invention relates to a method for the production of epitaxial films of large single crystals of inorganic compounds.

More particularly, this invention relates to a method for the production of epitaxial films comprising the sulfides, selenides and tellurides of beryllium, zinc, cadmium, mercury and mixtures thereof. Substrates suitable for these epitaxial films comprise seed crystals of compounds selected from the same class of compounds comprising the epitaxial film, I-VII and III-V compounds, silicon or germanium.

It is an object of this invention to provide a new and economical method for the production of the above-described class of compounds which are characterized as having a crystalline structure and existing as well-defined single crystals.

A still further object of this invention is the formation and deposition of epitaxial films of the above-described materials upon substrates of the same or different materials.

The II-VI compounds of the present invention are prepared by interacting two gaseous mixtures comprising as one of them a complex reaction mixture formed by contacting a gaseous hydrogen halide, e.g., hydrogen chloride, hydrogen bromide or hydrogen iodide, with a Group II element at a temperature sufficiently high to react these components and to volatilize the Group II halide that is formed. The exact composition of this reaction mixture is not fixed but consists of hydrogen, unreacted hydrogen halide and Group II halide in a proportion depending on the temperature and the halide employed. The second gaseous mixture is formed by contacting a stream of gaseous hydrogen with a Group VI element or a volatile Group VI compound at a temperature insufficient to cause reaction with the hydrogen. At this stage of the process the hydrogen serves primarily as a carrier for the Group VI element or compound.

Compounds of Group VI elements which are of particular utility include halides, hydrides and alkyl derivatives. Preferred compounds in this group are the halides of Group VI elements, e.g., the chlorides, bromides and iodides. Typical compounds include tellurium tetrachloride, selenium and sulfur mono- and tetrachlorides, tellurium tetrabromide, selenium and sulfur mono- and tetrabromides, tellurium tetraiodide and selenium and sulfur mono- and tetraiodides, selenium hydride and tellurium hydride.

The two gaseous mixtures are then intermixed in a reaction tube at a temperature sufficient to deposit the II-VI compound as an epitaxial film on a seed crystal substrate situated in the reaction tube. In general, the II-VI compound deposits from the complex reaction when the latter is subjected to a lower temperature level.

The temperature used in carrying out the reaction between the above described II-B compound-hydrogen halide reaction mixture and the VI-B component-hydrogen mixture will generally be above about 25° C. to as much as 1500° C., a preferred operating range being from 300° C. to 1200° C.

The only temperature requirements are that the temperatures of the tubes leading from the II-B and VI-B reservoirs be no lower than the temperature of the respective reservoirs and that the temperature of the reaction tube be below the melting (or decomposition) point of the substrate. For the II-B elements the reservoir temperature is usually within the range of from 200° C.–1000° C. and for the VI-B element or compound, from 100° to 900° C. The time required for the reaction is dependent upon the temperature and the degree of mixing and reacting. The hydrogen halide-II-B and hydrogen-VI-B gaseous components may be introduced individually through nozzles, or may be premixed as desired.

In conducting the vapor phase reaction between the Group II-B reaction mixture and the Group VI-B-hydrogen mixture for the production of a crystalline solid II-VI compound, it is essential that gaseous hydrogen be present in the system when the Group VI-B component is a halide and that oxidizing gases be excluded.

The apparatus employed in carrying out the process of the present invention may be any of a number of types. The simplest type constitutes a closed tube of a refractory material such as glass, quartz or a ceramic tube such as mullite into which the crude reactant materials are introduced. The tube may then be sealed off and the specific reactants subjected to desired temperatures within the above ranges for a period of from less than one minute to one hour or more, until the reaction is complete.

On a larger scale, the present process is, preferably, operated as a continuous flow system. This may constitute a simple reaction tube in which the seed crystal is located and in which hydrogen gas is then passed to flush oxygen from the system. Into this tube are passed the above-described reaction mixtures along the same or one or more additional conduits. The II-VI compound formed in the reaction tube deposits as an epitaxial layer on the seed crystal. Various other modifications including horizontal and vertical tubes are also contemplated, and recycle systems in which the exit gas after deposition of the single crystal product is returned to the system are also desirable.

An advantage of the present method for the production of epitaxial films of II-VI compounds is the ease of obtaining high purity products. In contrast to this method, the conventional method for the preparation of II-VI compounds beginning with the respective elements from the Group II and Group VI series requires a difficult purification procedure and are not as effective when dealing with the metals in contrast to the present invention. For example, the high-temperature vapor-phase reaction employed in the present method inherently introduces another factor favoring the production of pure materials, since the vaporization of the respective Group II and Group VI elements or compounds, e.g., the halides, results in a further rejection of impurities. The desired reaction for the production of the II-VI compound occurs between the Group II-hydrogen halide reaction mixture, the GroupVI-B element or compound and hydrogen to yield the II-VI compound. As a result, it is found that unusually pure materials which are of utility in various electrical and electronic applications, such as in the manufacture of semiconductors, are readily obtained.

The most important aspect of this invention is the provision of a means of preparing and depositing epitaxial films of the purified single crystal material onto various substrates. These deposited films permit the fabrication of new electronic devices discussed hereinafter. The characteristic feature of epitaxial film formation is that starting with a given substrate material, e.g., cadmium telluride or gallium arsenide, having a certain lattice structure and oriented in any direction, a film, layer or overgrowth of the same or different material may be vapor-deposited upon the substrate. The vapor deposit has an orderly atomic lattice and assumes the same lattice structure and geometric configuration of the substrate. When using a certain material, e.g., gallium arsenide, as the substrate and another material, e.g., zinc selenide as the film deposit it is necessary that lattice distances of the deposit material closely approximate those of the substrate in order to obtain an epitaxial film. In this connection it is pointed out that crystal lattice "mismatches" up to about 40% are tolerable. That is, while, preferably, the crystal lattice of the epitaxial film approximate closely that of the seed crystal substrate, still, epitaxial films are successfully prepared when the crystal lattice spacing of the epitaxial film and the substrate differ by up to 40%.

The seed crystal may have any orientation, e.g., the crystallographic plane exposed to the depositing film may have the <100>, <110>, <111>, <112>, <113>, etc., crystal faces exposed. However, it has been found that superior epitaxial films result when the seed crystal is oriented <100> or <111>B and, preferably, the <100> orientation. The <111>B crystal face is the <111> face having the Group VI element exposed, e.g., in CdTe the <111>B face has tellurium atoms exposed. When other crystal orientations are employed, e.g., <110> or <111>A, the epitaxial films deposited on them are operable, but are more likely to be less smooth and uniform in thickness.

A particular advantage of the present method for the production of epitaxial films of II-VI compounds is that in forming the epitaxial layer on the substrate, the substrate is not affected and therefore sharp changes in impurity concentration can be formed. By this method it is possible to prepare sharp and narrow junctions, such as p-n junctions, which cannot be prepared by the conventional methods of diffusing and alloying.

The thickness of the epitaxial film may be controlled as described and is dependent upon reaction conditions such as temperatures within the reactor, gas flow rates and time of reaction. In general, the formation of large single crystals and thicker layers is favored by higher temperatures as defined above, and larger flow rates.

As stated hereinbefore, the epitaxial films formed in accordance with this invention comprise compounds formed from elements of Groups II–B and VI–B of the periodic system. Included in this group of compounds are the sulfides, selenides and tellurides of beryllium, zinc, cadmium, mercury and mixtures thereof. Similarly, single crystal II-VI compounds having the cubic sodium chloride type structure may be used as substrates for epitaxial growth of the II-VI compounds when the II-VI crystal face upon which growth is to occur is the <111> (preferably, the <111>B) or <100> crystallographic face. In this manner the oxides, sulfides, selenides and tellurides of magnesium, calcium, strontium and barium, as well as cadmium oxide, are used as substrates. Preferred II-VI compounds include zinc sulfide, zinc selenide, zinc telluride, cadmium sulfide, cadminium selenide, cadmium telluride, mercury sulfide, mercury selenide, mercury telluride, beryllium sulfide, beryllium selenide and beryllium telluride.

In addition to the use of the above compounds by themselves, mixtures of these compounds are also contemplated as epitaxial films, e.g., cadmium telluride and zinc sulfide mixed in varying proportions when produced by the instant process produce suitable semi-conductor compositions.

Representative individual binary crystals of the Group II and Group VI components contemplated in this invention are listed in the table with the value of their forbidden energy gap.

TABLE

| Compound: | Energy gap, electron volts |
| --- | --- |
| ZnS | 3.7 |
| ZnSe | 2.6 |
| Cds | 2.4 |
| ZnTe | 2.1 |
| CdSe | 1.77 |
| CdTe | 1.50 |
| HgSe | 0.65 |
| HgTe | 0.025 |

It is well known that combinations of these compounds can be formed to give mixed binary crystals, including ternary and quarternary compositions, which have a value of the forbidden energy gap different from those of the two parent binary crystals and usually having a value that is intermediate between those of the parent binary crystals. For example, the forbidden energy gap of $Cd_{.5}HG_{.5}Te$ is about 0.25 electron volt. Other such combinations have the formulae $Be S_x Se_{(1-x)}$, $Be_x Zn_{(1-x)} S$, $ZnSe_x Te_{(1-x)}$, $Zn_x Cd_{(1-x)} Se$, $CdSe_x Te_{(1-x)}$, $Cd_x Hg_{(1-x)} Te$, $HgSe_x Te_{(1-x)}$, $Zn_y Cd_{(1-y)} Se_x Te_{(1-x)}$ and $$CdS_x(Se_y Te_{(1-y)})_{(1-x)}$$

where $x$ and $y$ have a numerical value greater than zero and less than one.

Materials useful as substrates herein include the same materials used in the epitaxial films as described above and, in addition, compounds of elements of Groups III and V (III-V compounds) and compounds of Groups I and VII elements (I-VII compounds), having the cubic (ZnS) structure, and the elements silicon and germanium, as well as metals having the cubic crystalline structure are suitable substrates. Suitable dimensions of the seed crystal are 1 mm. thick, 10 mm. wide and 15–20 mm. long, although larger or smaller crystals may be used.

As will be described hereinafter, the materials used herein either as films or substrates or both may be used in a purified state or containing small amounts of foreign materials as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group I of the periodic system, e.g., copper, silver and gold or an element or compound thereof selected from Group V of the periodic system, e.g., phosphorus, arsenic and antimony or halides thereof are incorporated into the reaction components in order to produce p-type conductivity, and an element or compound thereof from Group III, e.g., boron aluminum, gallium and indium or halides thereof, to produce n-type conductivity. These "impurities" are carried over with the reactant materials into the vapor phase and deposited in a uniform dispersion in the epitaxial film of the formed product on the substrate. Since the proportion of dopant deposited with the II-VI compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as $InCl_3$ to the reservoir of the Group II and/or VI components, or the dopant can be added with a separate stream of hydrogen from a separate reservoir.

Doping is easily controlled in the present process and either low or unusually high orders of doping are easily obtained, e.g., in the manufacture of tunnel diodes which require as much as 0.1% by weight of doping. The carrier concentrations are of the order of $5 \times 10^{19}$ to $2 \times 10^{20}$. The dopant is vaporized together with the Groups II or VI components or from a separate reservoir to obtain unusually homogeneous distribution of the dopant in the epitaxial film. For example, n-type dopants such as the elements or halides of boron, aluminum, gallium and indium, as well as p-type dopants such as silver, copper, phosphorus, arsenic and antimony or halides thereof are vaporized in the appropriate concentration relative to the II-VI material described herein to obtain suitable semiconductor material for tunnel diodes.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical porperties desired in the final product. Suitable amounts contemplated herein range from $1 \times 10^{15}$ to $5 \times 10^{20}$ atoms/cc. of product.

Vapor deposits of the purified material having the same conductivity type as the substrate may be utilized to form intrinsic pp+ or nn+ regions.

Variations of the preceding techniques permit the formation of products having a plurality of layers of epitaxial films upon the substrate, each layer having its own electrical conductivity type and resistivity as controlled by layer thickness and dopant concentration. Since the vapor deposited material assumes the same lattice structure as the substrate wherever the two materials contact each other, small areas of the substrate may be masked from or exposed to the depositing host material. By this means one is able to obtain small regions or surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., cadmium telluride is vapor deposited upon a substrate of indium antimonide. Subsequently, a quantity of the same material with different doping agents or different concentrations of the same dopant or another of the described materials, e.g., zinc sulfide, may be vapor deposited from starting materials comprising these elements with a fresh quantity of gas as a second epitaxial film over the epitaxial film of cadmium telluride already deposited on the substrate. This procedure with any desired combination of layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, the thickness of the epitaxial film and the impurity concentration are controllable to obtain a variety of electrical effects required for specific purposes as discussed elsewhere herein.

Various electronic devices to which these epitaxially filmed semiconductors are applicable include diodes (e.g., tunnel diodes), parametric amplifiers, transistors, high frequency mesa transistors, solar cells, thermophotovoltaic cells, components in micromodule circuits, rectifiers, thermoelectric generators, radiation detectors, optical filters, wattmeters, and other semiconductor devices.

The invention will be more fully understood with reference to the following illustrative specific embodiments:

*Example 1*

This example illustrates the formation and deposition of an epitaxial film of p-type CdS on n-type AlAs as the substrate.

A polished seed crystal of n-type AlAs containing $1.0 \times 10^{17}$ carriers/cc. dispersed therein is placed in a fused silica reaction tube located in a furnace. The AlAs seed crystal is placed on a silica support inside said tube. The reaction tube is heated to 580° C. and a stream of hydrogen is directed through the tube for 15 minutes to remove oxygen from the surface of the AlAs.

A stream of hydrogen chloride is then directed through a reservoir of elemental cadmium maintained at about 680° C. thus reacting with and vaporizing the cadmium, and the resulting reaction product is then conducted through a heated tube from the reservoir to the reaction tube containing the AlAs seed crystal.

Meanwhile, separate and equal streams of gas are conducted through separate tubes containing in one of them a reservoir of sulfur monochloride, $S_2Cl_2$ heated to about 115° C. and in the other a body of silver iodide dopant heated to about 680° C. The gas conducted through the $S_2Cl_2$ is hydrogen and that through the AgI is hydrogen iodide. From the heated tubes the $S_2Cl_2$ and AgI are carried by the gas on through the tubes to the reaction tube. The separate streams of gas carrying the vaporized $S_2Cl_2$ and AgI conjoin with the hydrogen chloride-cadmium reaction mixture in the fused silica reaction tube where a reaction occurs in which a single crystal film of p-type cadmium sulfide is formed on the seed crystal of n-type aluminum arsenide as an epitaxial layer which exhibits about $10^{18}$ carriers (holes) per cc.

X-ray diffraction patterns show that the deposited layer is single crystal in form and oriented in the same fashion as the substrate.

Rectification tests show that a p-n junction exists at the region of the junction between the epitaxial layer and the seed crystal substrate.

When germanium is substituted as substrate for aluminum arsenide, in this example, the resulting product is a p-type cadmium sulfide epitaxial overgrowth on the germanium seed crystal. Similarly, when a silicon seed crystal substrate is employed a p-n junction is formed by deposition of an epitaxial film of p-type cadmium sulfide thereon.

*Example 2*

The same procedure outlined in Example 1 is repeated but selenium monochloride, $Se_2Cl_2$, heated to about 115° C. is substituted for the sulfur monochloride. In this example, a seed crystal of n-type GaP weighing 1.45 g. and containing about $5.5 \times 10^{17}$ carriers/cc. of sulfur dispersed therein is used.

In the reaction tube, the hydrogen chloride-cadmium reaction mixture and the gaseous mixture of hydrogen and $Se_2Cl_2$ and AgI dopant together with hydrogen iodide react to form p-type cadmium selenide, CdSe, which deposits from the vapor phase onto the seed crystal of n-type GaP. The reaction is allowed to proceed for 1.5 hours, after which the product is removed from the reaction tube, weighed and is found to have increased in weight by 0.01 g. The crystal upon X-ray examination is found to consist of an overgrowth of single crystal p-type CdSe having the same crystal orientation as the n-type GaP substrate. The crystal exhibits rectification showing that a p-n junction exists at the boundary between the epitaxial overgrowth and the substrate.

*Example 3*

This example illustrates the formation of a product having an n-type ZnSe overgrowth on a p-type GaAs substrate.

The apparatus and procedure outlined in Examples 1 and 2 are used and followed generally, except that the reservoir containing the II–B element, i.e., elemental zinc, also contains a quantity of an element to be used as the doping agent for the vapor-deposited compound. To the zinc in the reservoir is added gallium in the amount corresponding to 0.01% of the amount of zinc, i.e., a sufficient quantity to yield $1 \times 10^{17}$ carriers/cc. in the deposited product. In a second tube leading to the reaction tube is a reservoir of selenium monochloride, $Se_2Cl_2$.

A seed crystal of gallium arsenide containing about $5.8 \times 10^{17}$ carriers/cc. of cadmium dispersed therein to provide p-type conductivity, is placed in the reaction tube located in the furnace. The furnace is then heated to 500° C. and a stream of hydrogen directed through the reaction tube for about 20 minutes to remove any oxygen present.

The reservoir of elemental zinc containing the gallium is heated to 600° C. to react the components with a stream of hydrogen bromide passing through the reservoir, to the reaction tube. Simultaneously, the second tube containing the $Se_2Cl_2$ is heated to about 115° C. in the presence of a stream of hydrogen. The vaporized $Se_2Cl_2$ is also carried to the reaction tube wherein the HBr-zinc reaction mixture reacts with the $Se_2Cl_2$ and hydrogen in the presence of the gallium dopant to produce n-type zinc selenide which deposites from the vapor phase as a uniform layer upon the seed crystal of p-type gallium arsenide.

In the present example selenium tetrachloride $SeCl_4$ may be used in place of the $Se_2Cl_2$.

The product, upon examination shows an epitaxial layer of single crystal zinc selenide having the same crystal structure and orientation as the GaAs substrate. The crystal exhibits rectification indicating the existence of a p-n junction between the epitaxial layer and the substrate.

While the foregoing examples have illustrated the use of single crystal germanium, silicon and III-V compounds, typified by aluminum and gallium arsenides and gallium phosphide, in a similar manner other III-V compounds, such as the nitrides, phosphides, arsenides and antimonides of boron, aluminum, gallium and indium are likewise suitable as substrates for epitaxial overgrowth of II-VI compounds.

The use of single crystal II-VI compounds as a substrate for epitaxial films of II-VI compounds is shown in the examples below.

*Example 4*

This example illustrates the preparation of an n-type zinc telluride substrate having deposited thereon an epitaxial overgrowth of p-type mercury selenide.

The procedure described in the preceding example is repeated, except that the seed crystal used is n-type zinc telluride containing about $5.8 \times 10^{18}$ carriers/cc. of gallium dispersed therein. The reservoir containing the II–B element, mercury, also contains sufficient copper, doping agent to dope the subsequently formed mercury selenide to a carrier concentration of about $1 \times 10^{17}$ carriers/cc. The VI–B compound used in this example is selenium tetrachloride. The tube containing the reservoir of selenium tetrachloride is heated to 160° C. while passing a stream of hydrogen therethrough, while the mercury and copper are heated to 320° C. in a stream of hydrogen iodide. These separate gaseous streams containing the vaporized reactions are then conducted to the reaction tube which is heated to 250° C. and contains the zinc telluride seed crystal. Here, the vaporized reactants intermix and mercury selenide containing the copper doping agent dispersed therein deposits from the vapor phase onto the seed crystal.

Again, X-ray diffraction patterns of the substrate crystal show that the deposited layer is single crystal in form and oriented in the same manner as the substrate.

Rectification tests show the presence of a p-n junction as in preceding examples.

*Example 5*

This example illustrates the formation and deposition of an epitaxial film of p-type CdTe on n-type CdTe as the substrate is employed.

A polished seed crystal of n-type CdTe containing $10^{17}$ carriers/cc. is placed in a fused silica reaction tube located in a furnace. The CdTe seed crystal is placed on a graphite support inside said tube. The reaction tube is heated to 580° C. and a stream of hydrogen is directed through the tube for 15 minutes to remove oxygen from the system.

A stream of hydrogen chloride is then directed through a reservoir of elemental cadmium maintained at about 680° C. thus reacting with the cadmium and the gaseous reaction mixture is then conducted by the hydrogen chloride through a heated tube from the reservoir to the reaction tube containing the CdTe seed crystal.

Meanwhile, separate and equal streams of gas are conducted through separate tubes containing in one of them a quantity of $TeCl_4$ heated to 360° C and in the other a body of CuCl (dopant) heated to 520° C. The gas conducted through the $TeCl_4$ is hydrogen and that through the CuCl is hydrogen chloride. From these heated tubes the $TeCl_4$ and CuCl are carried by the hydrogen on through the tubes to the reaction tube. The separate streams of hydrogen carrying vaporized $TeCl_4$, CuCl and the hydrogen chloride-cadmium reaction mixture conjoin in the fused silica reaction tube where a reaction occurs between the gaseous hydrogen mixture and the hydrogen chloride-cadmium reaction mixture in which a single crystal film of p-type cadmium telluride is formed on the seed crystal of n-type cadmium telluride as an epitaxial layer which exhibits about $10^{18}$ carriers (holes) per cc. The seed crystal after 1.5 hours weighs 3.54 g.

X-ray diffraction patterns of the product show that the deposited layer is single crystal in form and oriented in the same fashion as the substrate.

Rectification tests show that a p-n junction exists at the region of the junction between the epitaxial layer and the seed crystal substrate.

*Example 6*

The same procedure outlined in Example 5 is repeated, but elemental tellurium heated to about 800° C. is substituted for the tellurium tetrachloride, and hydrogen bromide is substituted for hydrogen chloride. In this example, a seed crystal of n-type CdTe contining about $10^{17}$ carriers/cc. dispersed therein is used. As in the preceding example, cadmium telluride (Cu doped to about $10^{19}$ carriers/cc.) epitaxially deposits on the substrate forming a p-n junction therewith.

When elemental sulfur or selenium is substituted for the elemental tellurium in this example, an epitaxial film of the corresponding Group II sulfide or selenide is likewise obtained and forms a p-n junction with the substrate.

When germanium and silicon are substituted as substrate for the zinc telluride and cadmium telluride in the preceding examples, similar results obtain, i.e., epitaxial deposits of mercury selenide and cadmium telluride respectively form on the germanium and silicon seed crystals to form p-n junctions.

*Example 7*

This example illustrates the formation of a product having an n-type mercury telluride overgrowth on a I-VII compound substrate, typified by silver chloride.

The apparatus and procedure outlined in Example 3 is used and followed, generally, and the reservoir containing the II–B element, mercury, also contains a quantity of a component to be used as the doping agent for the vapor-deposited compound. To the elemental mercury contained in the reservoir is added aluminum as dopant in the amount corresponding to 0.001% of the amount of mercury, e.g., a quantity to yield $1 \times 10^{17}$ carriers/cc. in the deposited product. In a second tube leading to the reaction tube is placed a body of tellurium tetrachloride.

A seed crystal of silver chloride is placed in the reaction tube located in the furnace. The furance is then heated to 400° C.

The reservoir of mercury containing the aluminum is heated to 350° C. and the components react and are volatilized with a stream of hydrogen chloride passing through the reservoir to the reaction tube. Simultaneously, the second tube containing the TeCl$_4$ is heated to about 350° C. in the presence of a stream of hydrogen. The vaporized TeCl$_4$ is also carried to the reaction tube wherein the hydrogen chloride-mercury reaction mixture combines with the gaseous mixture of TeCl$_4$ and hydrogen in the presence of the aluminum dopant to deposit n-type mercury telluride from the vapor phase as a uniform layer upon the seed crystal of silver chloride.

The product, upon examination shows an epitaxial layer of single crystal mercury telluride having the same crystal orientation as the silver chloride substrate, and exhibits a large Hall voltage indicating the existence of a thin conducting layer on a non-conducting substrate.

*Example 8*

This example illustrates the deposition of an epitaxial film of zinc sulfide onto a substrate of a I-VII compound having the cubic zinc blende structure typified by single crystal copper iodide.

A polished seed crystal of single crystal copper iodide having approximate dimensions of 2 mm. thick, 15 mm. wide and 20 mm. long is placed in a fused silica reaction tube located in a furnace. The reaction tube is heated to 550° C.

A stream of hydrogen iodide is then directed through a reservoir of elemental zinc containing about 0.001% gallium and maintained at about 650° C. thus reacting with zinc and gallium. The gaseous reaction mixture is then conducted through a heated tube containing the copper iodide seed crystal.

Meanwhile, a separate stream of hydrogen is conducted through a separate tube containing a body of sulfur monochloride, S$_2$Cl$_2$ heated to 115° C. From this heated tube the vaporized S$_2$Cl$_2$ is carried by the hydrogen on through the tube to the reaction tube.

The separate streams of the hydrogen iodide-zinc reaction mixture and S$_2$Cl$_2$ mixed with hydrogen conjoin in the fused silica reaction tube where a reaction occurs in which a single crystal form of n-type zinc sulfide is formed as a film-deposit on the single crystal copper iodide substrate.

X-ray diffraction patterns of the film deposit and substrate show that the deposited layer is single crystal in form and has the same lattice orientation as the substrate, hence the zinc sulfide forms an epitaxial film on the single crystal copper iodide substrate.

The Hall coefficient of the film of ZnS on the copper iodide substrate is found to be —300 cm.$^3$/coulomb, making it of utility in magnetic Hall devices. The film also exhibits photoconduction.

While the foregoing examples have illustrated the use of single crystal I-VII compounds typified by silver chloride and copper iodide as the substrate, in a similar manner the fluorides, chlorides, bromides and iodides of copper, silver and gold having the zinc blende structure are likewise used as substrates for epitaxial overgrowths of II-VI compounds. Similarly, single crystal I-VII compounds having the cubic sodium chloride type structure may be used as substrate for epitaxial growth of II-VI compounds. In this manner, the fluorides, chlorides, bromides and iodides of sodium, lithium, potassium, rubidium and cesium are used as substrates. Preferred I-VII compounds include copper fluoride, copper chloride, copper bromide, copper iodide, and silver iodide.

*Example 9*

This example illustrates the procedure for producing a product having a plurality of layers of different electrical properties.

The procedure here is similar to that followed in the preceding examples, and the apparatus is the same.

The reservoir containing the Group II–B element mercury is heated to 350° C. in a stream of hydrogen chloride while the tube containing a reservoir of the Group VI–B compound, SeCl$_4$, is heated to about 160° C. in a stream of hydrogen and a separate tube containing CuCl (dopant) is heated to 320° C. in a stream of hydrogen chloride. These separate streams containing the vaporized reactants are conducted to the reaction tube which contains a seed crystal of polished n-type zinc telluride doped to a carrier concentration of about $5.8 \times 10^{17}$ atoms/cc. of aluminum. In the reaction tube, previously flushed with hydrogen and heated to 250° C., the vaporized reactants combine and react to form p-type mercury selenide which deposits from the vapor phase onto the n-type zinc telluride seed crystal. The reaction proceeds for about 15 minutes, after which the flow of the separate streams of hydrogen and hydrogen chloride are discontinued. Additional reservoirs containing, respectively, elemental zinc doped with a trace amount of Ga heated to 550° C. and TeBr$_2$ heated to 300° C. are then opened to the reactor which is now heated to 450° C. Hydrogen is again flowed through the Group VI component reservoir and the hydrogen chloride supply is again opened to stream through the elemental zinc reservoir. Again, the vaporized reactants are carried to the reaction tube and in the reaction n-type zinc telluride deposits from the gaseous reaction mixture upon the p-type HgSe layer previously deposited on the n-type zinc telluride seed crystal.

After the reaction has proceeded to completion the product upon examination is found to consist of a substrate of n-type zinc telluride, having successive layers of p-type mercury selenide and n-type zinc telluride. These deposited layers exhibit the same X-ray orientation pattern as the single crystal zinc telluride substrate indicating the same orientation and single crystal form characteristic of epitaxial films.

The product further exhibits rectification showing the presence of an n-p junction between the n-type zinc telluride and the p-type mercury selenide and a p-n junction between the latter compound and the n-type zinc telluride. When this example is repeated substituting silicon and germanium, respectively, for the ZnTe substrate, substantially similar results occur.

By this method any number and combination of epitaxial and non-epitaxial layers may be deposited one upon the other.

An alternative to the foregoing procedure is to connect a fourth tube containing a second Group II–B element reservoir and hydrogen halide supply to the reaction tube at a point near the junction of the tube containing the first II–B element reservoir and the tube containing the Group VI–B element, or compound, reactant. The fourth tube is closed off during the first phase of the process, i.e., while the first epitaxial layer is being formed, and thereafter opened to the system while closing off the tube containing the first II–B element.

A still further modification of this invention is to use a mixture of Group II–B elements in one or more reservoirs and/or a mixture of the Group VI–B elements or compounds in another reservoir(s) and proceed in the usual manner. Illustrations of this modification are shown in the following examples:

*Example 10*

This example illustrates the preparation of an epitaxial film of a ternary composition of II-VI elements on a ZnTe substrate.

A polished seed crystal of p-type ZnTe containing $5.5 \times 10^{17}$ carriers/cc. of gold dispersed therein is placed in the fused silica reaction tube. The tube is heated to 500° C. and a stream of hydrogen is directed through the tube for 15 minutes to remove any oxygen present.

A mixture of elemental cadmium and elemental mercury is placed in the reservoir for the II–B component as described in preceding examples, and a body of Se$_2$Br$_2$ is placed in another tube connected to the reaction tube. The $S_2Br_2$ contains indium chloride as dopant.

A stream of hydrogen bromide is then directed through the reservoir containing the mixture of cadmium and mercury and heated to about 550° C., while a stream of hydrogen is then passed over the $Se_2Br_2$ in the other tube heated to about 150° C. The vaporized components in both tubes are then carried to the reaction tube containing the ZnTe seed crystal. In the reaction tube heated to 500° C., the vaporized hydrogen bromide-cadmium-mercury reaction mixture combines and reacts with the vaporized hydrogen-$Se_2Br_2$ and indium chloride mixture to form a cadmium mercury selenide mixed binary crystal which deposits from the vapor phase in single crystal form as an epitaxial film on said p-type ZnTe seed crystal. The n-type mixed crystal layer is shown by X-ray diffraction patterns to have the same crystal orientation as the seed crystal, characteristic of epitaxial layers and upon analysis is found to have the formula $Cd_{0.5}Hg_{0.5}Se$.

*Example 11*

This example illustrates the preparation of an epitaxial film of a three component mixed binary crystal of II–VI elements on a gallium arsenide substrate.

A seed crystal of n-type gallium arsenide containing $5.8 \times 10^{17}$ carriers/cc. is placed in the fused silica reaction tube which is flushed with hydrogen to remove oxygen. A quantity of zinc is placed in the reservoir for the Group II–B element, and a mixture of elemental sulfur and selenium containing CuCl is placed in a second tube connected to the reaction tube. (A variation of this arrangement is to use three tubes connected to the reaction tube, one tube containing the reservoir for II–B element and the remaining two tubes each containing a separate VI–B element.)

The zinc reservoir is then heated to about 500° and a stream of hydrogen iodide passed therethrough, while the tube containing the VI–B elements is heated to about 325–350° C., while a stream of a mixture of hydrogen and hydrogen chloride is directed through it. The vaporized components in both tubes are conducted to the reaction tube containing the seed crystal. In the reaction tube, heated to 400° C., the hydrogen iodide-zinc reaction mixture combines with and reacts with the vaporized sulfur-selenium-hydrogen-hydrogen chloride mixture containing the CuCl dopant to form a mixed binary compound, which upon analysis is found to have the formula $ZnS_{0.2}Se_{0.8}$, which deposits from the vapor phase onto the gallium arsenide seed crystal.

Analysis of the filmed product shows uniform crystal orientation in both layer and substrate indicating epitaxial connection of the layer to the substrate. This product likewise exhibits rectification, showing the existence of a p-n junction between the CuCl doped n-type epitaxial layer and the zinc doped p-type gallium arsenide seed crystal.

By varying the flow rates of gas through the Group II–B reservoir and through the respective sulfur and selenium reservoirs according to the aforementioned variation of this example, epitaxial films of ternary compositions over the whole range of $ZnS_xSe_{1-x}$ are obtained, where X has a value less than 1 and greater than zero.

In accordance with the present embodiment of this invention, epitaxial films of ternary compositions of II–B-VI–B elements may be prepared merely by reacting a hydrogen halide reaction product of one Group II–B element with two Group VI–B elements admixed with hydrogen, or vice-versa, i.e., by reacting two Group II–B elements reacted with a hydrogen halide with one Group VI–B element in the presence of hydrogen. Thus, epitaxial films of these ternary compositions may be formed by combining a sum of three Group II–B elements and Group VI–B elements in any combination in the presence of hydrogen and hydrogen halide.

*Example 12*

This example illustrates the preparation of epitaxial films of quaternary mixed binary crystals of II–VI elements.

A mixture of elemental cadmium and elemental mercury is placed in one reservoir and a mixture of selenium and tellurium containing a small amount of $InCl_3$ dopant is placed in a second reservoir. Both reservoirs are connected to a quartz reaction tube containing a polished seed crystal of zinc-doped GaAs. (This arrangement may be varied a number of ways, e.g., by placing each reactant in separate reservoirs along a common conduit to the reaction tube or each reservoir may have its own conduit to the reaction tube.)

A stream of hydrogen chloride is passed through the reservoir containing the cadmium and mercury which is heated to about 550° C., and the reservoir containing the $InCl_3$-selenium-tellurium mixture is heated to about 360° C. while a hydrogen stream is directed through it. The gaseous components in both reservoirs are then conducted through quartz tubes to the reaction tube which is heated to about 500° C. The separate streams carrying the reactants converge in the reaction tube where the hydrogen chloride-cadmium and mercury reaction mixture is reacted with the hydrogen-selenium and tellurium mixture containing $InCl_3$ for about 1 hour to form a four-component mixed binary crystal having the formula $Cd_{0.4}Hg_{0.6}Se_{0.5}Te_{0.5}$ which deposits as an epitaxial film on the GaAs seed crystal.

This product, having a gallium arsenide substrate of p-type conductivity and an epitaxial film of n-type conductivity, exhibits rectification suitable for use in semiconductor devices.

Similarly, other four-component mixed binary crystals of II–VI compounds may be deposited as epitaxial films merely by combining a reaction mixture of hydrogen halide and at least one Group II–B element with a mixture of hydrogen and at least one Group VI–B element, provided that the sum of the II–B elements and the VI–B elements reacted equals four. That is, one, two or three Group II–B elements reacted with a hydrogen halide may be reacted with, respectively, three, two or one Group VI–B elements in the presence of hydrogen to produce epitaxial films of the quarternary compositions of II–VI elements of this embodiment of the present invention.

The products obtained according to the present invention have a variety of applications. For example, in electronic devices where it is desirable to have a substantially inert non-conducting base for II–VI semiconductor, the products described in Examples 7 and 8 are highly suitable. Where it is desired to obtain semiconductor components having semiconducting properties in the base material as well as in the epitaxial film, those products described in Examples 1–6 and Examples 9–12 above are of particular value.

Electronic devices may also be fabricated wherein a semiconducting component comprising an epitaxial film of II–VI compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such as Al–Zn, SbCoMn, BTi and $Cr_2Ti$.

The present invention is useful for producing II–VI compounds, per se, which are of utility as semiconductor components in electronic applications. For example, the II–VI compounds produced herein are useful as source materials for the preparation of epitaxial films of II–VI compounds by the hydrogen halide transport method as described in copending U.S. application Serial No. 209,739 filed July 13, 1962. Also, the II–VI compounds produced herein can be formed into large single crystals by conventional methods such as the Czochralski method or the Bridgman method to give materials having direct utility in electronic applications.

The compounds as produced according to the present method are usually a mixture of single crystal and polycrystalline material which may be compacted, for example, by hot-pressing techniques into shaped bodies for ultimate use.

*Example 13*

This example illustrates the formation of II–VI compounds, per se, as typified by cadmium sulfide.

A stream of hydrogen chloride is directed through a reservoir of elemental cadmium maintained at about 680° C. thus reacting with and vaporizing the cadmium, and the resulting gaseous reaction product is then conducted through a heated tube from the reservoir to a fused silica reaction tube heated to 580° C.

Meanwhile, a separate stream of hydrogen is conducted through a tube containing a reservoir of sulfur monochloride, $S_2Cl_2$, heated to about 115° C. From the heated tube the $S_2Cl_2$ is carried by the hydrogen on through the tube to the reaction tube. The separate stream of hydrogen carrying the vaporized $S_2Cl_2$ conjoins with the hydrogen chloride-cadmium reaction mixture in the fused silica reaction tube where a reaction occurs in which crystalline cadmium sulfide is formed on the walls of the reaction tube from which it is readily removed, e.g., by scraping.

The resistivity of a single crystal portion of the deposit is found to be 100 ohm-centimeters and exhibits n-type conduction.

Various other modifications of the instant invention will be apparent to those skilled in the art without departing from the spirit and scope thereof.

I claim:

1. Process for the production and deposition of epitaxial films comprised of compounds selected from the group consisting of the sulfides, selenides and tellurides of beryllium, zinc, cadmium, mercury and mixtures thereof, onto a substrate material selected from the group consisting of I–VII, II–VI, and III–V compounds, germanium and silicon, which comprises combining in the vapor phase (1) a gaseous mixture formed by the reaction of hydrogen halide and a Group II element selected from the group consisting of beryllium, zinc, cadmium and mercury: and (2) a gaseous mixture of hydrogen and a substance selected from the group consisting of a Group VI element selected from the group consisting of sulfur, selenium and tellurium and a volatile compound thereof while excluding oxidizing gases, and contacting the resulting reaction mixture with said substrate to deposit a single crystal form of at least one II–VI compound as an epitaxial film on said substrate.

2. Process for the production and deposition of an epitaxial film comprised of cadmium sulfide which comprises combining in the vapor phase (1) a gaseous mixture formed by the reaction of hydrogen chloride and elemental cadmium and (2) a gaseous mixture of hydrogen and sulfur chloride while excluding oxidizing gases, and contacting the resulting reaction mixture with a substrate comprised of gallium arsenide to deposit single crystal cadmium sulfide as an epitaxial film on said substrate.

3. Process for the production and deposition of epitaxial films comprised of compounds having modified electrical conductivity and being selected from the group consisting of the sulfides, selenides and tellurides of beryllium, zinc, cadmium, mercury and mixtures thereof, onto a substrate material selected from the class consisting of I–VII, II–VI and III–VI compounds, germanium and silicon, which comprises combining in the vapor phase (1) a gaseous mixture formed by the reaction of hydrogen halide and a Group II element selected from the group consisting of beryllium, zinc, cadmium and mercury, (2) a gaseous mixture of hydrogen and a substance selected from the group consisting of a Group VI element selected from the group consisting of sulfur, selenium and tellurium and a volatile compound thereof, and (3) a small amount of a doping agent while excluding oxidizing gases, and contacting the resulting reaction mixture with said substrate to deposit a single crystal form of at least one II–VI compound as an epitaxial film having one conductivity type on said substrate having a different conductivity type.

4. Process according to claim 3 wherein said doping agent is selected from the group consisting of elements and compounds in Groups I, III and V of the periodic system.

5. Process according to claim 4 wherein said hydrogen halide is hydrogen chloride, said Group II element is cadmium, said Group VI element is sulfur, said doping agent is a Group V element and said substrate is n-type gallium arsenide.

6. Process for the production and deposition of epitaxial films comprised of mixed binary crystals of compounds selected from the group consisting of the sulfides, selenides and tellurides of beryllium, zinc, cadmium, mercury and mixtures thereof, onto a substrate material selected from the group consisting of I–VII, II–VI and III–V compounds, germanium and silicon which comprises combining in the vapor phase (1) a gaseous mixture formed by the reaction of hydrogen halide and at least one Group II element selected from the group consisting of beryllium, zinc, cadmium and mercury: and (2) a gaseous mixture comprised of hydrogen and at least one substance selected from the group consisting of Group VI elements selected from the group consisting of sulfur, selenium and tellurium and volatile compounds thereof, provided that the sum of the Groups II and VI components reacted in said vapor phase is greater than two while excluding oxidizing gases, and contacting the resulting reaction mixture with said substrate to deposit a single crystal form of mixed binary crystal compounds as an epitaxial film on said substrate.

7. Process according to claim 6 wherein said epitaxial film and said substrate contain a small amount of doping agent to produce modified electrical conductivity.

8. Process for the production and deposition of a plurality of epitaxial layers comprised of compounds selected from the group consisting of the sulfides, selenides and tellurides of beryllium, zinc, cadmium, mercury and mixtures thereof, onto a substrate material selected from the group consisting of I–VII, II–VI and III–V compounds, germanium and silicon, which comprises combining in the vapor phase (1) a gaseous mixture formed by the reaction of hydrogen halide and at least one Group II element selected from the group consisting of beryllium, zinc, cadmium and mercury: and (2) a gaseous mixture of hydrogen and at least one substance selected from the group consisting of a Group VI element selected from the group consisting of sulfur, selenium and tellurium and a volatile compound thereof while excluding oxidizing gases, contacting the resulting reaction mixture with said substrate to deposit a single crystal form of at least one II–VI compound as an epitaxial film on said substrate, and repeating this procedure as many times as the number of epitaxial layers desired, but providing modified electrical properties in successive layers by inclusion therein of small amount of doping agents.

9. Process for the production of II–VI compounds selected from the group consisting of the sulfides, selenides and tellurides of beryllium, zinc, cadmium, mercury and mixtures thereof, which comprises combining in the vapor phase (1) a gaseous mixture formed by the reaction of hydrogen halide and a Group II element selected from the group consisting of beryllium, zinc, cadmium and mercury: and (2) a gaseous mixture of hydrogen and a substance selected from the group consisting of a Group VI element selected from the group consisting of sulfur, selenium and tellurium and a volatile compound thereof, while excluding oxidizing gases, to obtain a crystalline form of at least one of said II–VI compounds.

10. Process for the production of cadmium sulfide which comprises combining in the vapor phase (1) a gaseous mixture formed by the reaction of hydrogen chloride and elemental cadmium and (2) a gaseous mixture of hydrogen and sulfur chloride while excluding oxidizing gases, to obtain crystalline cadmium sulfide.

11. Process for the production of mixed binary crystals of II–VI compounds selected from the group consisting of the sulfides, selenides and tellurides of beryllium, zinc, cadmium, mercury and mixtures thereof, which comprises combining in the vapor phase (1) a gaseous mixture formed by the reaction of hydrogen halide and at least one Group II element selected from the group consisting of beryllium, zinc, cadmium and mercury: and (2) a gaseous mixture comprised of hydrogen and at least one substance selected from the group consisting of Group VI elements selected from the group consisting of sulfur, selenium and tellurium and volatile compounds thereof, provided that the sum of the Groups II and VI components reacted in said vapor phase is greater than two while excluding oxidizing gases, to obtain a crystalline form of said mixed binary crystal compounds.

References Cited by the Examiner

UNITED STATES PATENTS

| | | | |
|---|---|---|---|
| 2,692,839 | 10/1954 | Christensen et al. | 148—1.5 |
| 2,798,989 | 7/1957 | Welker | 148—1.5 |
| 2,858,275 | 10/1958 | Folberth | 148—1.5 X |
| 2,898,248 | 8/1959 | Silvey et al. | 148—175 |
| 2,974,064 | 3/1961 | Williams et al. | 252—62.3 |

FOREIGN PATENTS

| | | |
|---|---|---|
| 1,193,194 | 10/1959 | France. |
| 3,082,124 | 3/1963 | France. |
| 1,029,941 | 5/1958 | Germany. |
| 1,057,845 | 5/1958 | Germany. |

OTHER REFERENCES

Anderson, "Germanium-Gallium Arsenide Heterojunctions," IBM Journal of Research and Development, vol. 4, No. 3, July 1960, pp. 283–287.

Antell et al., "Preparation of Crystals of InAs, InP, GaAs and GaP, Vapor Phase Reaction," Journal of the Electrochemical Society, vol. 106, June 1959, pp 509–510.

Holonyak, Jr., et al., Article in AIME Publication of Metallurgy of Semiconductor Materials, Aug. 30-Sept. 1, 1961, vol. 15, Interscience Publishers, pp. 49–59.

Lyons et al., "Forming a Compound PN Junction," IBM Technical Disclosure Bulletin, vol. 3, No. 8, Jan. 1961, p. 3.

Marinace, "Vapor Growth of InSb, Crystals by an Iodine Reaction," IBM Technical Disclosure Bulletin, vol. 3, No. 8, Jan. 1961, p. 33.

DAVID L. RECK, *Primary Examiner.*

RICHARD D. NEVIUS, *Examiner.*